US010982993B2

United States Patent
Kaseda et al.

(10) Patent No.: US 10,982,993 B2
(45) Date of Patent: Apr. 20, 2021

(54) OVERLOAD DETECTION PROCESSING APPARATUS, OVERLOAD DETECTION SYSTEM AND COMPUTER-READABLE RECORDING MEDIUM STORING PROGRAM

(71) Applicant: KONICA MINOLTA, INC., Tokyo (JP)

(72) Inventors: Takumi Kaseda, Tokyo (JP); Asahi Ebe, Hachioji (JP)

(73) Assignee: KONICA MINOLTA INC., Tokyo (JP)

( * ) Notice: Subject to any disclaimer, the term of this patent is extended or adjusted under 35 U.S.C. 154(b) by 42 days.

(21) Appl. No.: 16/381,598

(22) Filed: Apr. 11, 2019

(65) Prior Publication Data

US 2019/0339110 A1  Nov. 7, 2019

(30) Foreign Application Priority Data

May 2, 2018  (JP) .............................. JP2018-088590

(51) Int. Cl.
*G01B 11/16* (2006.01)
*G01G 19/62* (2006.01)
(Continued)

(52) U.S. Cl.
CPC .......... *G01G 19/022* (2013.01); *G01B 11/16* (2013.01); *G01G 19/62* (2013.01); *G01G 23/48* (2013.01);
(Continued)

(58) Field of Classification Search
CPC .......... G06T 7/001; G06T 2207/30252; G01G 19/022; G01G 3/12; G01G 19/62; G01G 23/48; G01B 11/16
(Continued)

(56) References Cited

U.S. PATENT DOCUMENTS 5,877,454 A * 3/1999 Uehara .................. G01G 23/48
177/1
7,855,662 B2 * 12/2010 Yano ...................... G01G 19/02
340/933
(Continued)

FOREIGN PATENT DOCUMENTS

CN 201633728 * 11/2010
CN 202770521 * 3/2013
(Continued)

*Primary Examiner* — Jacques M Saint Surin
(74) *Attorney, Agent, or Firm* — Buchanan Ingersoll & Rooney PC

(57) ABSTRACT

An overload detection processing apparatus, an overload detection system and a computer-readable recording medium storing a program capable of determining overload more accurately are provided. An overload detection processing apparatus for determining a vehicle whose loading weight exceeds a predetermined reference is provided with a processor. The processor acquires a determination value relating to magnitude of deformation of a tire from image data obtained by photographing the tire of the vehicle and determines whether or not the loading weight of the vehicle exceeds a predetermined reference based on data corresponding to the determination value and a situation relating to the tire.

25 Claims, 11 Drawing Sheets

(51) Int. Cl.
*G01G 23/48* (2006.01)
*G06T 7/00* (2017.01)
*G01G 19/02* (2006.01)

(52) U.S. Cl.
CPC .... *G06T 7/001* (2013.01); *G06T 2207/30252* (2013.01)

(58) Field of Classification Search
USPC ...................................... 177/25.12
See application file for complete search history.

(56) References Cited

U.S. PATENT DOCUMENTS

| | | | |
|---|---|---|---|
| 8,160,806 B2* | 4/2012 | Salaka | B60D 1/58 701/124 |
| 8,661,885 B1* | 3/2014 | Singh | B60C 23/064 73/146 |
| 2016/0200155 A1* | 7/2016 | Steinmeyer | B60C 23/06 73/146.2 |
| 2018/0015793 A1* | 1/2018 | Spinnler | B60C 23/0476 |

FOREIGN PATENT DOCUMENTS

| | | | |
|---|---|---|---|
| CN | 110553594 | * | 12/2019 |
| JP | 10272907 | * | 10/1998 |
| JP | 10272907 A | | 10/1998 |
| JP | 2019211223 | * | 12/2019 |
| KR | 20130054547 | * | 5/2013 |

* cited by examiner

FIG.5

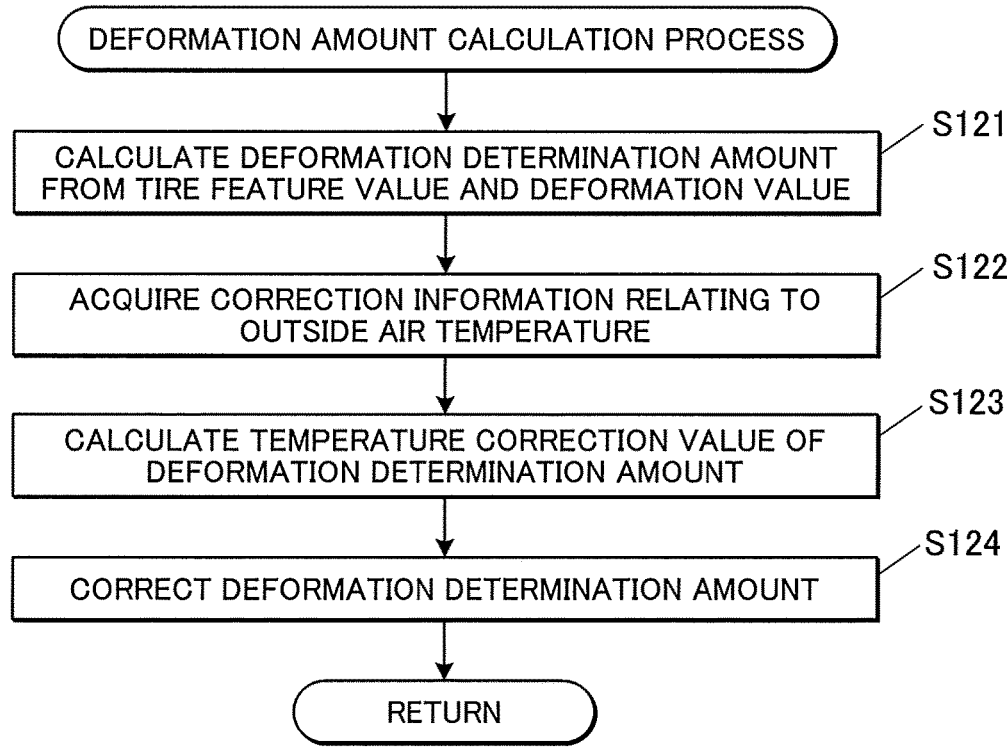

```
DEFORMATION AMOUNT CALCULATION PROCESS
                    ↓
CALCULATE DEFORMATION DETERMINATION AMOUNT       — S121
FROM TIRE FEATURE VALUE AND DEFORMATION VALUE
                    ↓
ACQUIRE CORRECTION INFORMATION RELATING TO       — S122
OUTSIDE AIR TEMPERATURE
                    ↓
CALCULATE TEMPERATURE CORRECTION VALUE OF        — S123
DEFORMATION DETERMINATION AMOUNT
                    ↓
CORRECT DEFORMATION DETERMINATION AMOUNT         — S124
                    ↓
                 RETURN
```

FIG.6

| OUTER DIAMETER | DETERMINATION REFERENCE VALUE OF DEFORMATION DETERMINATION AMOUNT | | |
|---|---|---|---|
| MEASURED VALUE [inch] | TABLE A | TABLE B | TABLE C |
| 70 | a1 | b1 | c1 |
| 80 | a2 | b2 | c2 |
| 90 | a3 | b3 | c3 |
| 100 | a4 | b4 | c4 |
| 110 | a5 | b5 | c5 |
| 120 | a6 | b6 | c6 |

FIG.10

| ACCELERATION [m/s²] | SOUND VOLUME [dB] | VIBRATION [dB] | DEFORMATION DETERMINATION AMOUNT EQUIVALENT VALUE |
|---|---|---|---|
| 10 | s1 | v1 | d1 |
| 20 | s2 | v2 | d2 |
| 30 | s3 | v3 | d3 |

OVERLOAD DETECTION PROCESSING APPARATUS, OVERLOAD DETECTION SYSTEM AND COMPUTER-READABLE RECORDING MEDIUM STORING PROGRAM

BACKGROUND

Technical Field

The present invention relates to an overload detection processing apparatus, an overload detection system and a computer-readable recording medium storing a program.

Description of the Related Art

Conventionally, there are systems that detect overload of freight vehicles such as trucks. Traveling of overloaded vehicles whose loading weights exceed a weight specified for the vehicles is undesirable from the standpoint of securing safety and road maintenance and the like, and so loading weights are being monitored in various places.

Techniques of actually measuring vehicle weights using weight measuring instruments embedded in a road are known as conventional monitoring systems. However, since such monitoring systems force vehicles to temporarily stop, the flow of traffic may be interrupted and weight measurement takes time and effort. Since the monitoring systems are provided on road surfaces on which vehicles pass, there are such problems that the road has to be blocked during maintenance of components involved in weight measurement. To address such problems, Japanese Patent Laid-Open No. 10-272907 proposes a technique of detecting overload by photographing tires of passing vehicles and calculating amounts of deformation thereof.

However, amounts of deformation of tires are influenced by various factors such as a surrounding environment and a traveling situation. Use of data of photographed tires alone is not sufficient to prevent large errors from occurring in estimation of load, resulting in a problem that overload may be determined erroneously.

SUMMARY

It is an object of the present invention to provide an overload detection processing apparatus, an overload detection system and a computer-readable recording medium storing a program capable of determining overload more accurately.

To achieve at least one of the abovementioned objects, according to an aspect of the present invention, an overload detection processing apparatus for determining a vehicle whose loading weight exceeds a predetermined reference includes a processor, the processor acquiring a determination value related to magnitude of deformation of a tire from image data obtained by photographing the tire of the vehicle and determining whether or not the loading weight of the vehicle exceeds the predetermined reference based on the determination value and data corresponding to a situation relating to the tire.

According to another aspect of the present invention, a computer-readable recording medium stores a program causing a computer to function to acquire a determination value related to magnitude of deformation of a tire from image data obtained by photographing the tire of the vehicle and determine whether or not a loading weight of the vehicle exceeds the predetermined reference based on the determination value and data corresponding to a situation relating to the tire.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 5 is a flowchart illustrating a control procedure of a deformation amount calculation process according to the first embodiment;

FIG. 6 is a diagram illustrating table examples relating to selection of a determination reference value of a deformation determination amount;

FIG. 10 is a diagram illustrating a correspondence relationship between measured data and vehicle acceleration;

DETAILED DESCRIPTION OF EMBODIMENTS

Hereinafter, one or more embodiments of the present invention will be described with reference to the drawings. However, the scope of the invention is not limited to the disclosed embodiments.

First Embodiment

Figure 1:
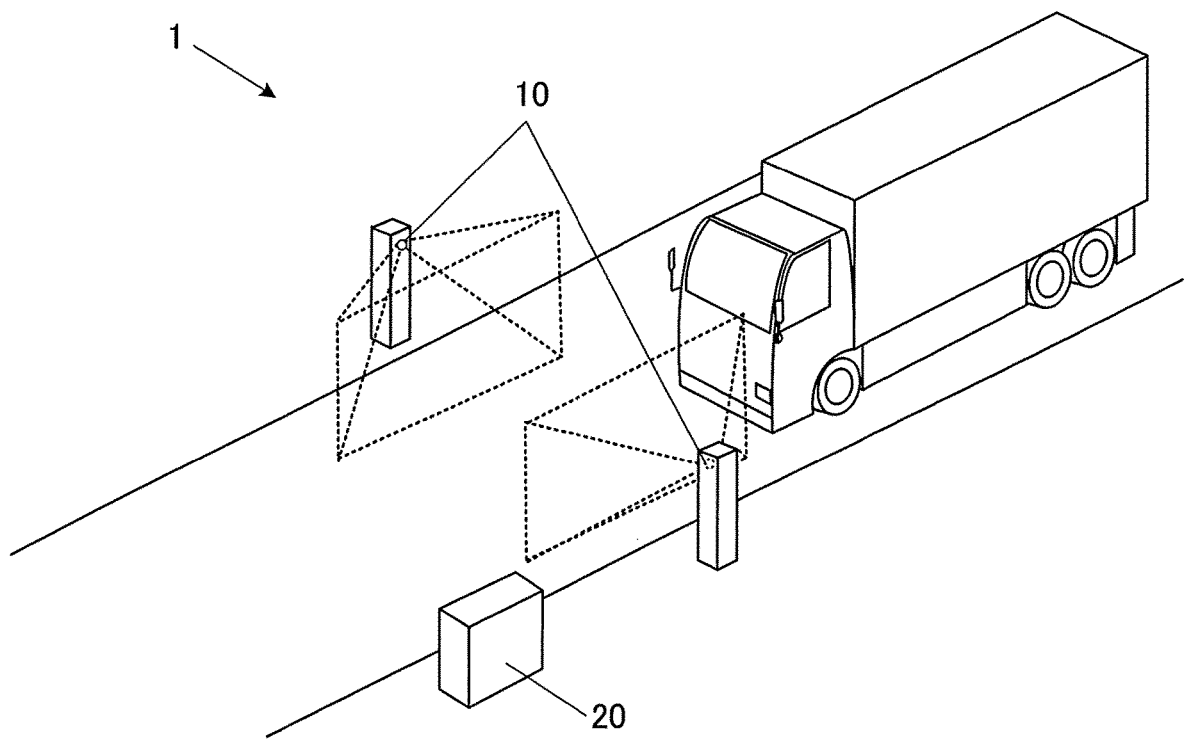
FIG. 1 is a schematic view illustrating an overall configuration of an overload detection system according to a first embodiment.

FIG. 1 is a schematic view illustrating an overall configuration of an overload detection system 1 according to a first embodiment. This overload detection system 1 includes a photographing apparatus 10 as a photographing device, a processing apparatus 20 as an overload detection processing apparatus and a measurer 30 (see FIG. 2) or the like.

Examples of the photographing apparatus 10 include an apparatus that performs moving image photographing within a two-dimensional plane or an apparatus that performs still image photographing consecutively at a predetermined time interval. Photographed images obtained by the photographing apparatus 10 are digital images. The photographing apparatus 10 outputs digital image data generated through photographing and sends the digital image data to the processing apparatus 20. Here, the photographing apparatuses 10 are disposed on both sides of a traveling route of vehicles so as to be able to photograph both sides of the vehicle including at least tires. Alternatively, the photographing apparatuses 10 may also be disposed so as to be able to photograph the front or back of the vehicle in addition to the sides of the vehicle.

The processing apparatus 20 analyzes the digital image data sent from the photographing apparatus 10, calculates a tire deformation amount (tire shape) and determines whether or not a loading weight exceeds a predetermined reference (overload) based on the calculated tire deformation amount.

As a situation relating to the tires of the vehicle, the measurer 30 measures environmental conditions surrounding the tires and a vehicle body situation (traveling situation) or the like, that is, parameters (variables) such as physical quantities or the like that can possibly change inside and outside the vehicle and acquires data corresponding to the situation relating to the tires. The measurer 30 will be described later. The measurer 30 constitutes a situation acquirer in the overload detection system of the present embodiment. This situation acquirer may also include the photographing apparatus 10.

Figure 2:
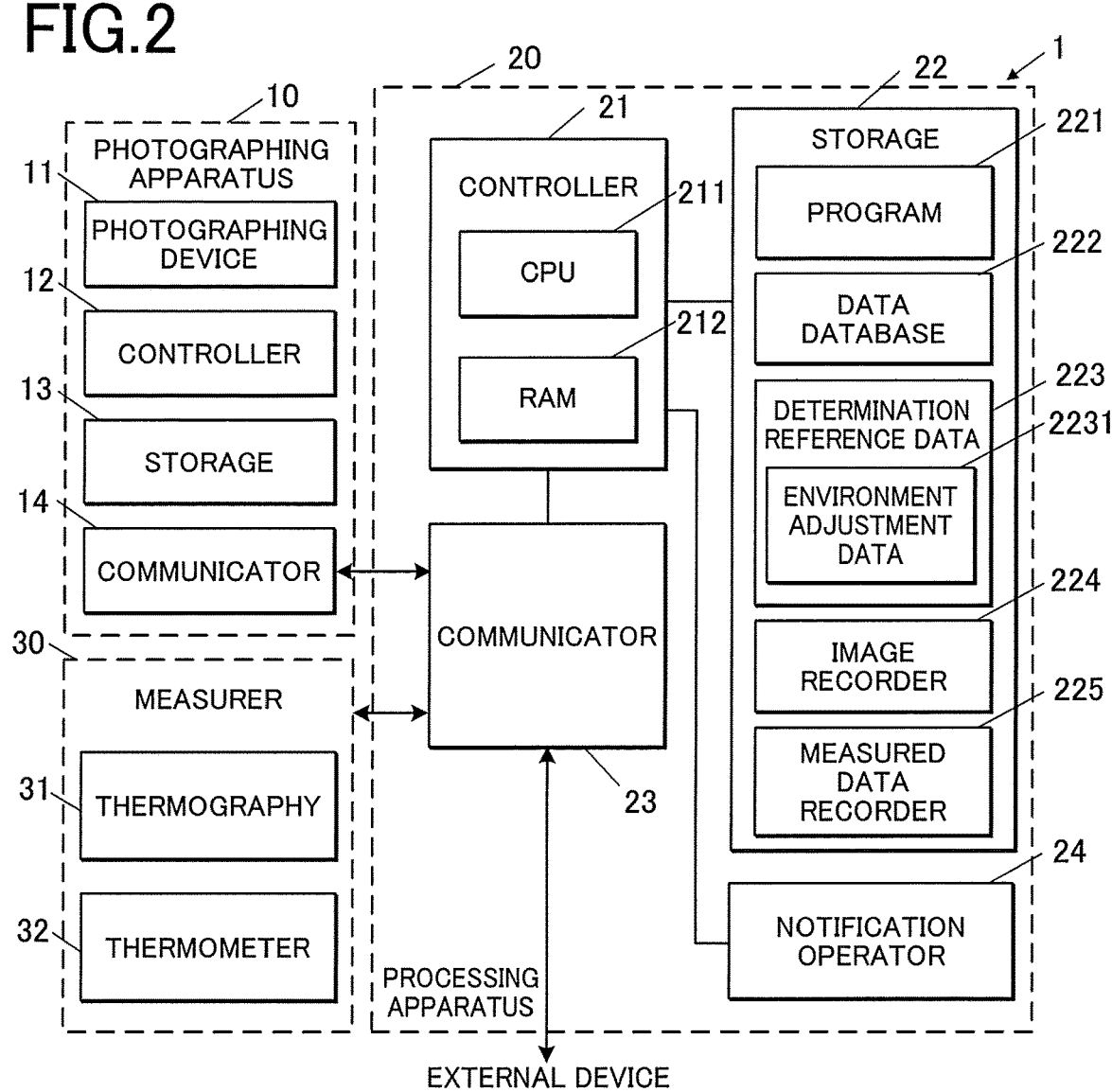
FIG. 2 is a block diagram illustrating a functional configuration of the overload detection system.

FIG. 2 is a block diagram illustrating a functional configuration of the overload detection system 1.

The photographing apparatus 10 is provided with a photographing device 11, a controller 12, a storage 13, and a communicator 14 or the like.

The photographing device 11 is provided with an optical apparatus that guides visible light introduced from outside to each pixel position and a detector that detects a quantity of incident light of each RGB color at each pixel position, or the like. The detector acquires two-dimensional photographed image data with image pickup devices two-dimensionally arrayed on an image pickup plane so that a pixel value (e.g., light quantity (brightness value) of each RGB color) at each pixel position can be acquired. Photographing is performed as moving images and the image data obtained through operation of the photographing device 11 is outputted to the storage 13. Alternatively, still images may be taken consecutively at a predetermined time interval. The controller 12 outputs image data temporarily stored in the storage 13 to the processing apparatus 20 via the communicator 14 at appropriate timing.

The processing apparatus 20 is a computer that performs operation processing and is provided with a controller 21, a storage 22, a communicator 23, a notification operator 24 or the like.

The controller 21 is a processor that integrally controls operation of the processing apparatus 20. The controller 21 is provided with a CPU 211 (Central Processing Unit) that performs various types of operation processing and a RAM 212 (Random Access Memory) that provides a work memory space to the CPU 211 and stores temporary data or the like. As will be described later, the controller 21 functions as vehicle type identification means, deformation amount acquisition means, determination means, correction means, reflection means, selection means, adjustment means, first estimation means and second estimation means.

The storage 22 stores various programs, setting data, recording image data and an analysis result thereof or the like. A non-volatile memory such as a read/write updatable flash memory or an HDD (Hard Disk Drive) or the like can be used as the storage 22. A program 221 and initial setting data or the like may also be stored in a mask ROM (Read Only Memory) or the like.

The program 221 includes an overload determination processing program. The CPU 211 of the controller 21 reads the program 221 and setting data from the storage 22, causes the RAM 212 to store the program 221 and setting data, and executes the program 221. The setting data includes a data database 222, determination reference data 223, an image recorder 224, a measured data recorder 225 or the like.

The data database 222 stores initial setting data relating to the size and type of a tire and a vehicle identified by the processing apparatus 20 from the image data. The setting data includes values corresponding to hardness of tires in an initial normal condition, the number of axles of the vehicle, the number of tires, an initial weight or the like. The setting data is table data (correspondence relationship between load deformation amount and loading weight of the vehicle) for converting a parameter relating to the calculated amount of tire deformation (load deformation amount) to a loading weight. The data database 222 is used to identify the type of a tire or a vehicle identified from the image data or may also be used to correct a determination reference relating to overload of the identified vehicle.

The determination reference data 223 stores various kinds of data used to determine the presence or absence of overload (determination list) for each type of the vehicle or tire (according to the data). The determination reference data 223 includes environment adjustment data 2231 for correcting the determination reference in accordance with traveling situations and environmental conditions of the vehicle.

The image recorder 224 records image data photographed by the photographing apparatus 10. The image data may be enabled to be overwritten and updated in the chronological order with the oldest data first within a predetermined capacity. Alternatively, after a predetermined time elapses, data may be periodically erased from the image recorder 224 and new image data may be recorded in a free space. The predetermined capacity is a capacity capable of storing image data for a sufficiently long time with respect to a processing time of each frame of photographed moving image data, and even when old data is deleted, causing no problem in decoding of subsequent frame data in accordance with a moving image encoding scheme. Images of frames or the like used for determination of overload may be further stored separately for a long period of time. Image data of frames determined to be overload may be stored until it is acquired separately from outside via the communicator 23 or the like.

The measured data recorder 225 records data measured by the measurer 30 (measured data). A recording region may be assigned to the measured data for each configuration of the measurer 30. The measured data may be overwritten and updated in the chronological order with the oldest data first within a predetermined capacity or after a predetermined time elapses, data may be periodically erased and new measured data may be recorded in a free space. Note that the frequency and timing at which measured data is acquired need not be synchronized with the frame rate of photographing (photographing frequency), but the frequency may be lower than the frequency of photographing. As with the photographing data, the measured data is stored for a sufficiently long period of time.

The communicator 23 performs control for communicating with an external apparatus (external device). The communicator 23 is, for example, a network card and receives image data from the photographing apparatus 10 and outputs a signal corresponding to the result of analysis of the image data by the controller 21 to the external apparatus. Examples of the external apparatus to which the signal is outputted include a notification apparatus that notifies a driver of an overloaded vehicle, an operation control apparatus for a passage intercepting machine that intercepts passage of overloaded vehicles or a monitoring apparatus whereby a monitoring person monitors overloaded vehicles.

The notification operator 24 performs predetermined notification operation on a user and/or a monitoring person of the processing apparatus 20 based on the control of the controller 21. Examples of the notification operation executed by the notification operator 24 include display operation on a predetermined display screen, beep sound generation operation or the like and a plurality of combinations thereof.

The measurer 30 here is provided with a thermography 31 and a thermometer 32 or the like.

The thermography 31 detects a surface temperature of a tire whose distortion state is to be detected without contact as one of traveling situations. The thermography 31 can perform temperature detection of the tire at substantially the same position as the photographing device 11 of the photographing apparatus 10. As will be described later, the thermography 31 may also be used for temperature detection of a road surface in addition to temperature detection of tires.

The thermometer 32 measures ambient temperature (outside air temperature) as one of environmental conditions. The thermometer 32 need not be provided in the immediate vicinity of the photographing apparatus 10 (that is, at side of a traveling route of vehicles). The thermometer 32 may be provided at a position apart from the traveling route by taking influences of exhaust gas from vehicles on temperature into account.

Note that in the overload detection system 1 according to the first embodiment, the thermography 31 or the thermometer 32 is used, but both are not used simultaneously as will be described later. Therefore, the measurer 30 may be provided with only necessary one.

Next, an overload determination operation by the processing apparatus 20 of the present embodiment will be described.

The processing apparatus 20 detects tires from image data received from the photographing apparatus 10 and calculates a deformation value relating to contact with ground. Overload determination is performed using the deformation value.

Figure 3:
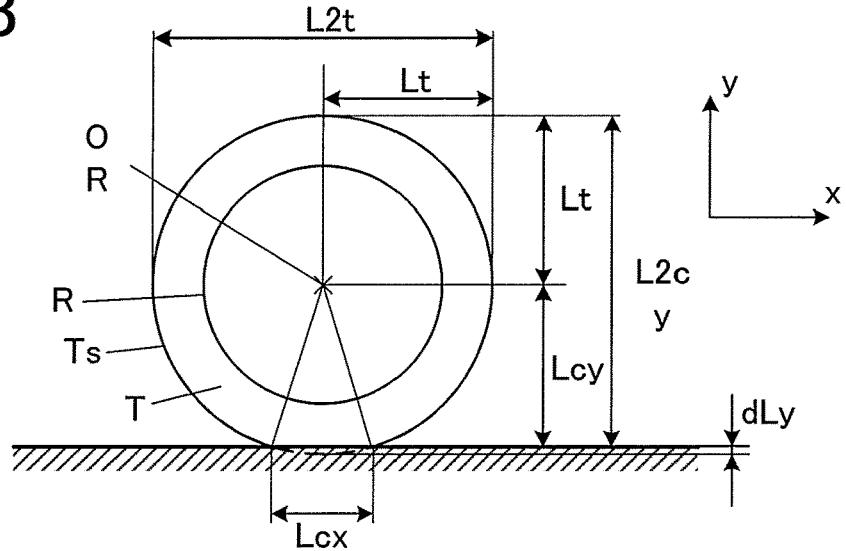
FIG. 3 is a diagram describing measured values relating to an amount of tire deformation.

FIG. 3 is a diagram describing measured values relating to an amount of deformation of the tire.

A tire T is attached to a wheel rim R of a wheel. To be exact, the tire T has a concave structure or the like on a surface thereof, but description will be given here assuming that an outer edge Ts (side outside edge) of the tire is detected and identified from a front image by ignoring the concave structure or the like. It is assumed here that the horizontal direction corresponds to an x-axis direction, the vertical direction corresponds to a y-axis direction, and the road surface, that is, the ground-contact surface of the tire is substantially horizontal, that is, extends along the x-axis direction. Note that though not particularly limited, an image to be analyzed will be described hereinafter as having a rectangular region, the vertical direction and the horizontal direction thereof correspond to the y-axis direction and x-axis direction respectively.

The outer edge Ts of the original tire T (with no deformation) having a tire diameter of $L2t$ (tire radius $Lt$) is compressed in the vertical direction by a compression width $dLy$ due to the weight or the like of the vehicle, and a ground-contact portion of the outer edge Ts is deformed in the form of extending flatly along the road surface (the linear ground-contact line in the frontal image). A ground-contact width $Lcx$ between both end points of the ground-contact line increases as the weight (loading weight) increases if a pneumatic pressure, material and structure of the tire are constant. Accordingly, a ground-contact distance $Lcy$ from a shaft position OR (rotation shaft position) which is the original central position when there is no tire deformation and which is the position of the rotation shaft, to the ground-contact surface and a longitudinal width $L2cy$ of the tire also become shorter. That is, the tire shape becomes a combination of the ground-contact line where the bottom surface becomes linear over the ground-contact width $Lcx$ and an arc portion which has neither ground contact nor deformation. Therefore, the tire shape is identified if a parameter (deformation value) indicating the ground-contact portion and a parameter (tire reference value) indicating the arc portion are obtained.

Here, a ratio (relative value) between a deformation value (value indicating a deformation amount) and a tire reference value (value based on data before deformation) is used as a deformation determination amount (determination value relating to the magnitude of deformation of the tire) to determine the presence or absence of overload. For example, in FIG. 3, when the tire reference value is the tire diameter $L2t$ and the deformation value is the ground-contact width of the tire $Lcx$, the deformation determination amount can be expressed as $Lcx/L2t$. The greater the weight (load) of the vehicle with respect to a predetermined tire reference value, the greater the deformation determination amount becomes. The presence or absence of overload is determined by determining whether or not this deformation determination amount exceeds the determination reference value (comparison value) corresponding to a limit loading weight (predetermined reference) of the vehicle. The selected deformation value and tire reference value may be combined with any one of the aforementioned values.

The determination reference value corresponding to the limit loading weight can vary depending on the ease of deformation of tires, that is, a correspondence relationship between the loading weight and the deformation value. Therefore, the determination reference value is defined depending on initial values relating to various kinds of data such as the type of a tire, the type of a vehicle, particularly the number of axles of tires, an axle width and the number of tires or the like, and stored as the determination reference data 223.

Furthermore, the ease of deformation of tires also varies depending on a situation relating to the tires, for example, temperature. Resin used for tires generally becomes less hard as the temperature rises and becomes more likely to deform. Here, a determination reference value or a correction value of the determination reference value may be defined according to an atmospheric temperature (may be linearly interpolated if necessary) or calculation expressions for calculating a correction value in accordance with a measurement temperature with respect to the determination reference value at a predetermined reference temperature may be defined, for example, by primary calculation expressions. Such information is stored here as environment adjustment data 2231 of the determination reference data 223. Furthermore, instead of the atmospheric temperature, a surface temperature at a predetermined region (predetermined location) of a tire, for example, immediately before ground-contacting of the ground-contact surface or on the outside surface or the like may be used or a predetermined typical value appropriately representing a surface temperature of the tire such as an average value or a weighted average value at a plurality of predetermined locations or the like may be used.

Figure 4:
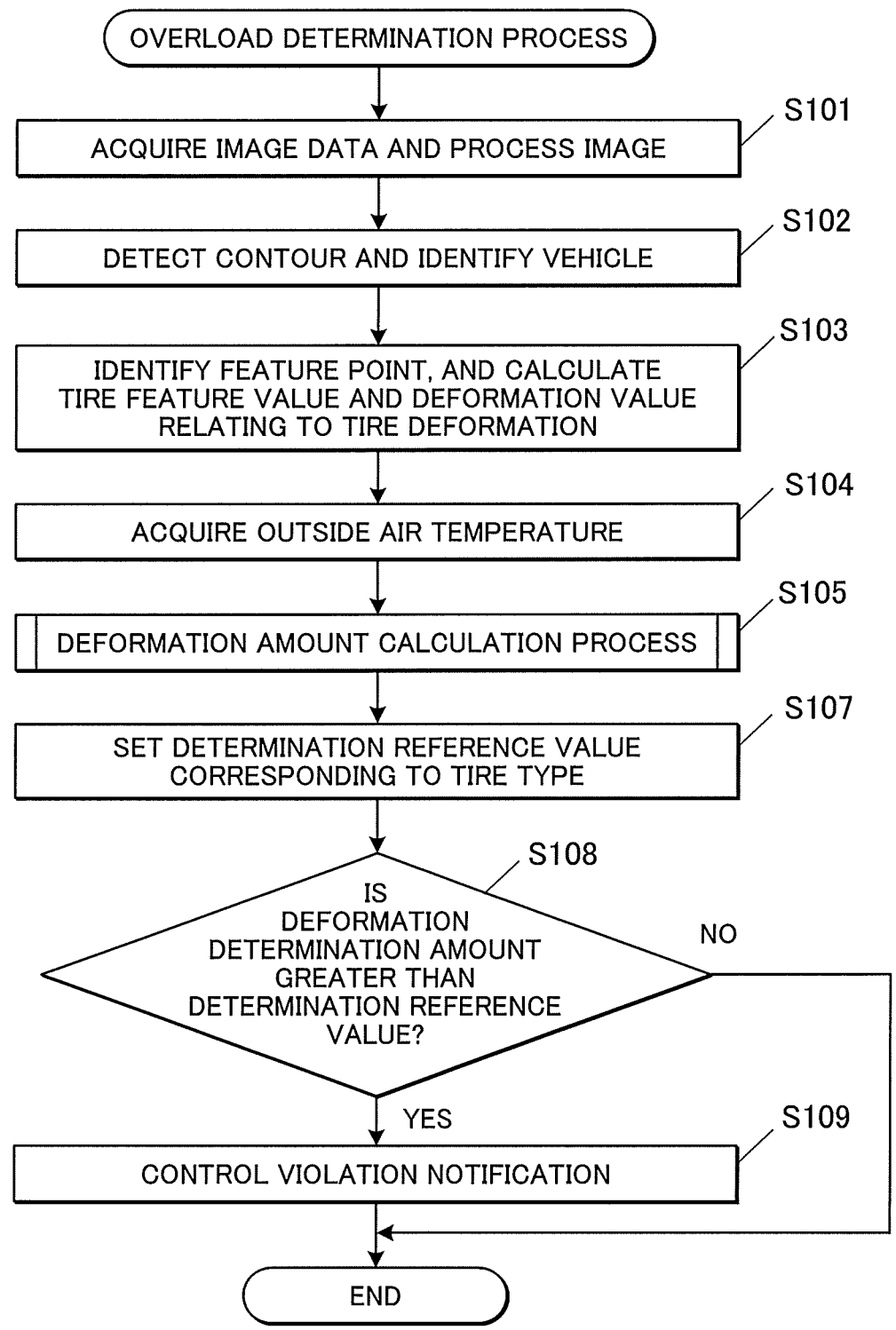
FIG. 4 is a flowchart illustrating a control procedure of an overload determination process according to the first embodiment.

FIG. 4 is a flowchart illustrating a control procedure of an overload determination process by the controller 21 executed in the processing apparatus 20 according to the present embodiment. The overload determination process is started every time each piece of frame data is extracted from a photographed image.

The controller 21 acquires image data (extracted frame data) and performs pre-processing on an image (step S101). The pre-processing may include exposure and/or contrast adjustment or the like. The pre-processing may also include processing of masking a fixedly photographed background portion or the like.

The controller 21 detects a contour from the image and identifies the vehicle (step S102; vehicle type identification means). The controller 21 detects edges in the image, extracts characteristic parts of the contour of the vehicle from among the edges and identifies the vehicle and the tire. Edge detection is not particularly limited, but, for example, a Canny method may be used. Edge detection may also be performed more simply using a differential image resulting from spatial differentiation of an original image and/or using a secondary differential value or the like. The controller 21 may designate portions other than those identified as edges as noise and perform processing of reducing the noise. Hough transformation or the like may be used to detect a circular shape of tires. The controller 21 identifies the type of a vehicle and the type and arrangement of a tire through pattern matching or the like based on the extracted vehicle body shape, a pattern and a labeling of the vehicle body surface, and contents of the data database 222. Note that in a photographed image, if the tire is inclined from a front direction, the controller 21 may perform processing of performing coordinate transformation on the image (front image) from the front direction.

When no vehicle is detected in the process in step S102 or when a vehicle is determined for which a determination relating to the presence or absence of overload has already been made, the controller 21 may omit and end subsequent processes.

The controller 21 identifies points on the contour (the perimeter of the tire and/or the position of an axle of the tire or the like) necessary to obtain a tire reference value and a deformation value of the identified tire, and calculates a tire reference value and a deformation value (step S103). The controller 21 identifies both end points of the tire in the horizontal direction to calculate the tire diameter L2t and identifies both ground-contact end points of the tire to calculate the ground-contact width Lcx.

The controller 21 acquires temperature measured data by the thermometer 32 from the measured data recorder 225 and acquires an atmospheric temperature (outside air temperature) (step S104). As described above, instead of the air temperature, the controller 21 may acquire a surface temperature distribution of the tire from the thermography 31 and acquire a temperature in the set region (in the present embodiment, the same shall apply hereinafter). The controller 21 calls and executes a deformation amount calculation process (step S105). In this deformation amount calculation process, the deformation determination amount is calculated. The processes in steps S104 and S105 constitute deformation amount acquisition means in the overload detection processing apparatus of the present embodiment.

The controller 21 selects, reads and sets determination reference values from the determination reference data 223 in accordance with the tire type (in accordance with the vehicle type if necessary) (step S107). The controller 21 determines whether or not the deformation determination amount is greater than the determination reference value (step S108; determination means). When it is determined that the deformation determination amount is greater than the determination reference value ("YES" in step S108), the controller 21 performs control relating to violation notification operation (step S109). The controller 21 causes the communicator 23 to output a control signal to the external apparatus that performs the above-described notification operation.

When it is determined that the deformation determination amount is not greater (is equal to or lower) than the determination reference value ("NO" in step S108), that is, the loading weight falls within a normal range and the controller 21 ends the overload determination process.

FIG. 5 is a flowchart illustrating a control procedure of a deformation amount calculation process by the controller 21 called in the overload determination process. When the deformation amount calculation process is called, the controller 21 calculates the deformation determination amount from the tire reference value and the deformation value (step S121).

Correction information relating to an atmospheric temperature (outside air temperature) is acquired from the environment adjustment data 2231 (step S122). The correction information may be a table of correction values of deformation determination amount corresponding to a temperature or a calculation expression expressing a correspondence relationship between a temperature and a correction value as described above. The controller 21 calculates a temperature correction value of the deformation determination amount based on the correction information (step S123). The controller 21 calculates the deformation determination amount corrected with this temperature correction value (step S124). The controller 21 ends the deformation amount calculation process and returns the process to the overload determination process. These processes in steps S122 to S124 constitute correction means in the processing apparatus 20 of the present embodiment.

As described above, the processing apparatus 20 according to the present embodiment is an overload detection processing apparatus for determining a vehicle whose loading weight exceeds a predetermined reference and is provided with the controller 21. The controller 21, as deformation amount acquisition means, acquires a deformation determination amount relating to the magnitude of deformation of the tire from image data obtained by photographing the tires of the vehicle. The controller 21, as determination means, determines whether or not the loading weight of the vehicle exceeds the predetermined reference based on the data corresponding to situations relating to the deformation determination amount and the tires.

That is, the controller 21 does not simply acquire the deformation determination amount from the image data and compares the deformation determination amount with the determination reference value but also adjusts the determination according to various situations of the tires (data corresponding to the situations). Therefore, this processing apparatus 20 can appropriately determine an increase or decrease in the tire deformation amount due to factors other than loading weights. Therefore, the processing apparatus 20 can determine overload more accurately.

The controller 21, as correction means, corrects the deformation determination amount based on the data corresponding to a situation relating to the tires. That is, the controller 21 increases/decreases the deformation determination amount itself from measured values according to external factors, and can thereby determine overload using the deformation determination amount more commensurate with the loading weight.

The situation relating to the tires include environmental conditions surrounding the tires. That is, since the tires are deformed due to external influences, by appropriately estimating external influences other than loading weights and excluding or reducing the influences, it is possible to perform overload determination more accurately.

The environmental conditions include a meteorological situation at a photographing location. That is, by reducing influences of a change of deformation values caused by conditions such as the aforementioned atmospheric temperature, it is possible to perform overload determination more accurately.

The meteorological situation includes an outside air temperature. That is, since expansion of air in tires due to an atmospheric temperature or the like causes the deformation value to change, reducing such influences through simple processing makes it possible to determine overload more accurately.

The processing apparatus 20 is provided with the storage 22 that stores a determination list that defines reference data relating to overload determination in accordance with data of the vehicle as the determination reference data 223 and the controller 21 identifies the type of the vehicle from image data as vehicle type identification means. The controller 21, as the determination means, selects an overload determination reference in accordance with the type of the vehicle from the determination reference data 223 and determines overload.

That is, the processing apparatus 20 can identify a variety of vehicle types and appropriately determine overload based on a correct determination reference.

The deformation determination amount is a relative value between a deformation value of a tire and a reference value based on data before deformation of the tire. Therefore, it is possible to appropriately determine the degree of deformation in question using common parameters irrespective of the size of tires.

The overload detection system 1 of the present embodiment is provided with the processing apparatus 20, the photographing apparatus 10 that photographs tires of the vehicle and the measurer 30 as a condition acquisition device that acquires a situation relating to the tires. That is, in the overload detection system 1, the measurer 30 acquires a situation relating to the tires and outputs the situation to the processing apparatus 20 in addition to photographing of the tires, and it is thereby possible to determine the presence or absence of overload more accurately and detect overloaded vehicles.

The program 221 stored in the computer-readable storage 22 causes a computer (the controller 21 of the processing apparatus 20) to function so as to acquire a determination value relating to the magnitude of deformation of the tire from the image data obtained by photographing the tires of the vehicle (deformation amount acquisition means) and determine whether or not the loading weight of the vehicle exceeds a predetermined reference (determination means) based on the determination value and the data corresponding to the situation relating to the tire.

Such a program 221 allows the controller 21 (CPU 211) to perform processing by software, and makes it possible to easily and more accurately determine overload. Therefore, it is possible to prevent the apparatus configuration from expanding in scale compared to the prior art, improve ease of maintenance and secure continuity.

Second Embodiment

Next, an overload detection system according to a second embodiment of the present invention will be described.

A configuration of an overload detection system 1 according to the second embodiment is identical to the configuration of the first embodiment, and so identical reference numerals will be used and description thereof will be omitted.

In the present embodiment, a deformation determination amount is corrected using both a surface temperature of a tire measured by the thermography 31 and an atmospheric temperature measured by the thermometer 32. A process relating to correction identical to the process shown in the first embodiment is performed on an atmospheric temperature. Therefore, the measurer 30 is provided with both the thermography 31 and the thermometer 32.

FIG. 6 is a diagram illustrating table examples relating to selection of a determination reference value of a deformation determination amount.

Here, three types of reference values (comparison value corresponding to each of a plurality of predetermined references) are set for an outer diameter (tire diameter) of a certain type of tire as table A, table B and table C. These table A to table C are selected based on a surface temperature of the tire. As described above, the temperature condition of the tire also has an influence. Here, reference values are directly selected and set according to surface temperatures of the tire (tire situation) respectively, and it is thereby possible to make determination accurately.

Figure 7:
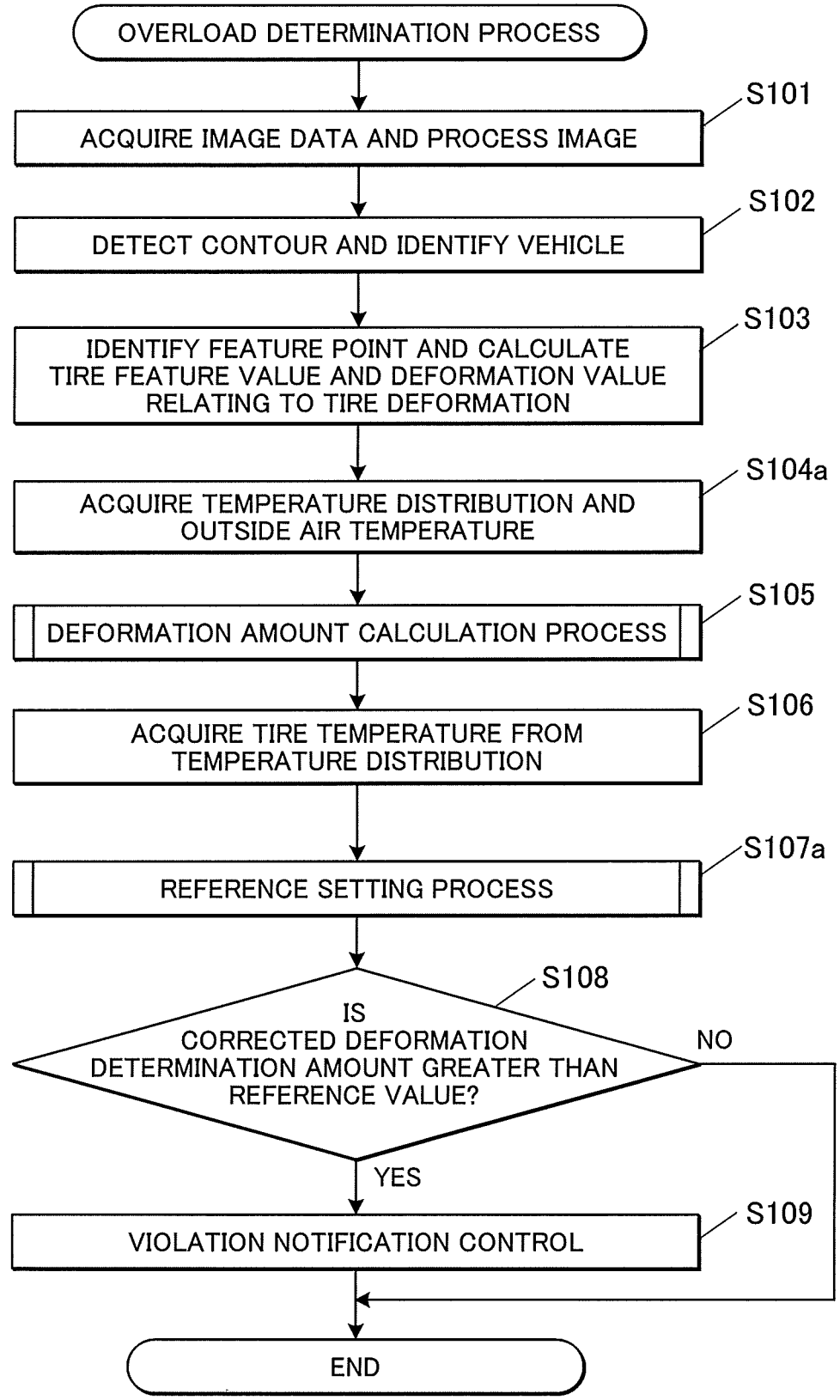
FIG. 7 is a flowchart illustrating a control procedure of an overload determination process according to a second embodiment.

FIG. 7 is a flowchart illustrating a control procedure of an overload determination process by the controller 21 executed in the processing apparatus 20 of the overload detection system 1 according to the second embodiment.

In this overload determination process, a process in step S106 is added to the overload determination process according to the above-described first embodiment. The process in step S104 is changed to step S104a and the process in step S107 is changed to step S107a.

After the process in step S103, the controller 21 acquires temperature distribution data from the thermography 31 and acquires an outside air temperature from the thermometer 32 (step S104a). The process of the controller 21 proceeds to step S105. After the deformation amount calculation process is performed in step S105, the controller 21 acquires a typical value of a surface temperature of the tire from the temperature distribution data (step S106). The controller 21 calls and executes a reference setting process (step S107a). The process of the controller 21 proceeds to step S108.

Figure 8:
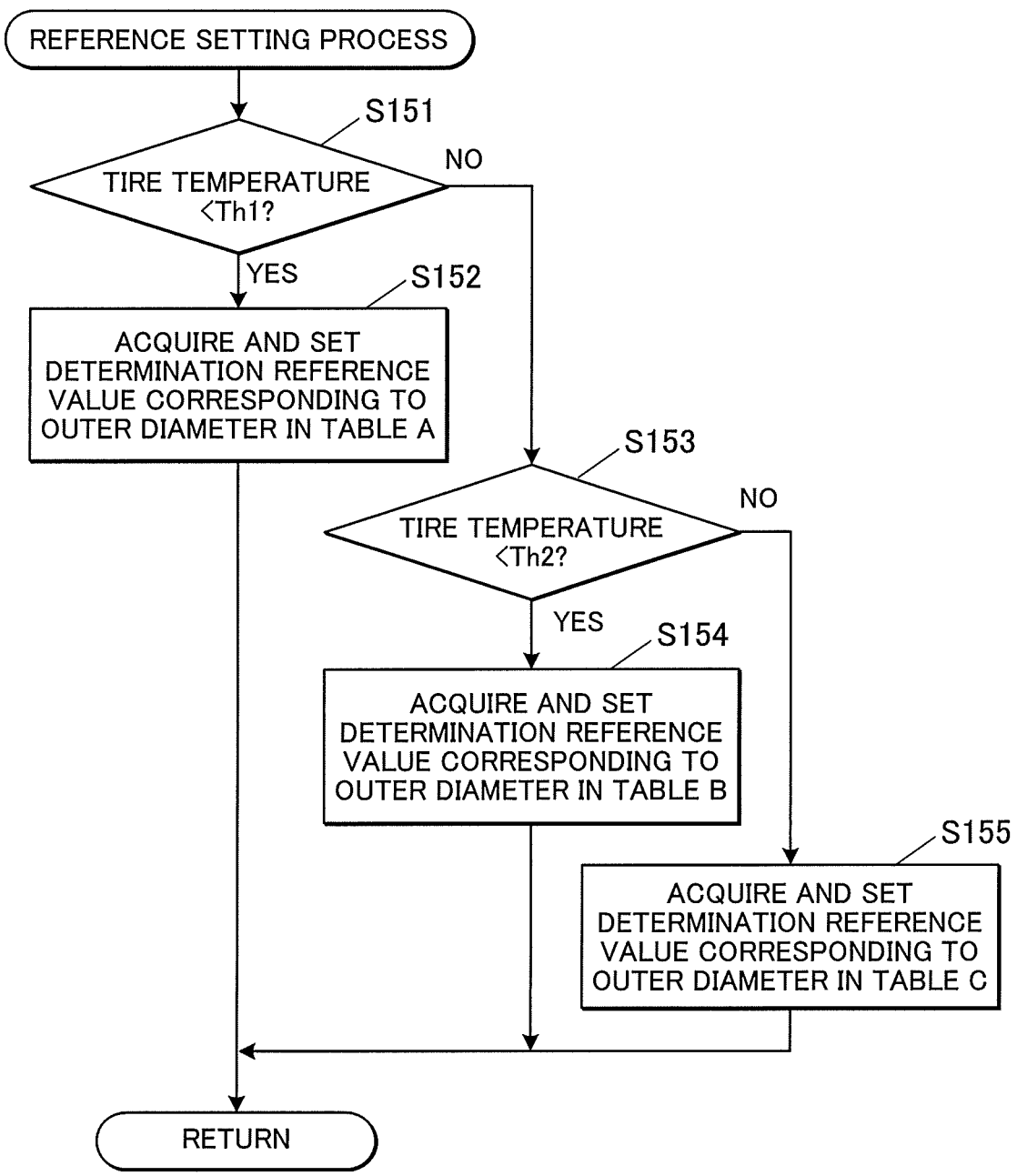
FIG. 8 is a flowchart illustrating a control procedure of a reference setting process according to the second embodiment.

FIG. 8 is a flowchart illustrating a control procedure of a reference setting process by the controller 21 called in the overload determination process shown in FIG. 7.

Upon calling the reference setting process, the controller 21 determines whether or not the acquired surface temperature of the tire (typical value) is less than a first reference temperature Th1 (step S151). When it is determined that the surface temperature is less than the first reference temperature Th1 ("YES" in step S151), the controller 21 acquires and sets determination reference values corresponding to the identified outer diameters of the tires based on table A shown in the diagram in FIG. 6 (step S152). The controller 21 then returns the process to the overload determination process.

In the determination process in step S151, if it is determined that the surface temperature is not less (equal to or higher) than the first reference temperature Th1 ("NO" in step S151), the controller 21 determines whether or not the surface temperature of the tire (typical value) is less than a second reference temperature Th2 (step S153). The second reference temperature Th2 is higher than the first reference temperature Th1.

When it is determined that the surface temperature is less than the second reference temperature Th2 ("YES" in step S153), the controller 21 acquires and sets a determination reference value corresponding to the outer diameter of the tire based on table B (step S154). The controller 21 then returns the process to the overload determination process.

When it is determined that the surface temperature is not less than (equal to or higher than) the second reference temperature Th2 ("NO" in step S153), the controller 21 acquires and sets a determination reference value in accordance with the outer diameter of the tire based on table C (step S155). The controller 21 returns the process to the overload determination process.

The reference setting process of the present embodiment constitutes selection means for selecting an appropriate determination reference (comparison value) from among a plurality of references.

As described above, in the processing apparatus 20 of the second embodiment, the controller 21 selects one of the plurality of predetermined references according to a situation relating to the tires as selection means. That is, by selecting and appropriately determining a determination reference value from among the plurality of reference values, it is possible to tolerate the occurrence of larger deformation than that of the original reference according to the ease of deformation of the tire in accordance with the situation or determine overload even when the deformation is smaller than that of the original reference. Therefore, even such processing can determine overload more accurately in accordance with the situation relating to the tires.

The situation relating to the tire includes a traveling situation of the vehicle. That is, the ease of deformation of the tire changes in accordance with various situations such as influences of the vehicle body itself and influences of a friction with the road surface relating to rotation of the tire, or deformation occurs for reasons other than the loading weight, and so the processing apparatus 20 can determine overload more accurately with these influences taken into consideration appropriately.

The traveling situation includes a surface temperature at a predetermined location (not limited to one location) of the tire. The surface temperature of the tire influences the air temperature in the tire and resin hardness of the tire or the like. The surface temperature of the tire can also influence a friction or the like with the road surface in accordance with the surface temperature of the tire. Therefore, it is possible to determine the presence or absence of overload more accurately by performing overload determination in consideration of the surface temperature of the tire on the simply calculated amount of deformation of the tire.

A determination list (determination reference values) is each stored for a situation relating to the tires, a range of surface temperatures of the tire here, and the controller 21 as determination means determines overload using a predetermined reference (determination reference value) in the determination list selected in accordance with the situation relating to the tires.

That is, since different determination reference values are selected and set in accordance with the situation relating to the tires, it is possible to flexibly determine overload based on a more accurate reference in accordance with the situation.

Third Embodiment

Next, an overload detection system according to a third embodiment will be described.

Figure 9:
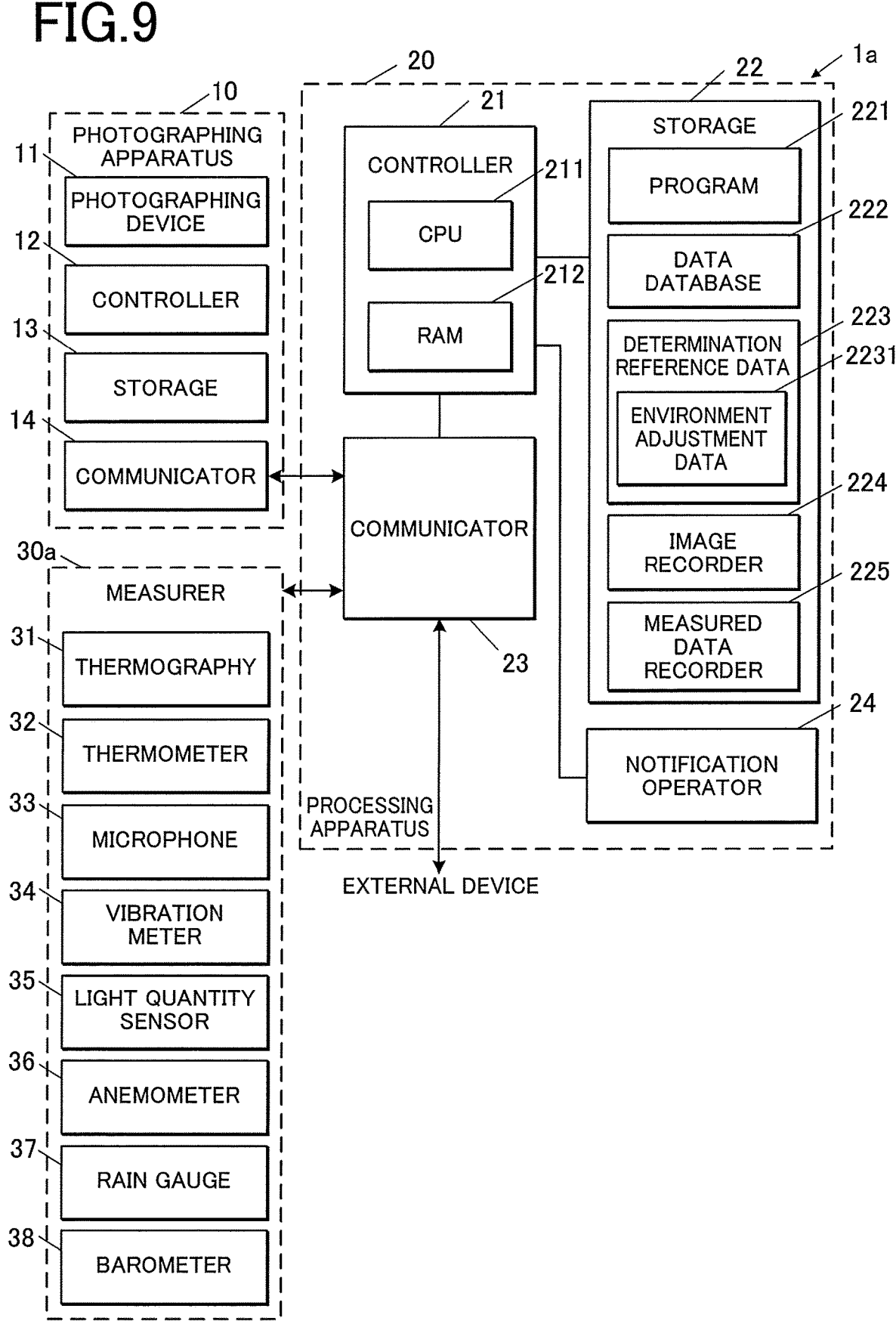
FIG. 9 is a block diagram illustrating a functional configuration of an overload detection system according to a third embodiment.

FIG. 9 is a block diagram illustrating a functional configuration of an overload detection system 1a according to the present embodiment.

In the overload detection system 1a, the measurer 30 is substituted by a measurer 30a. The measurer 30a includes a microphone 33, a vibration meter 34, a light quantity sensor 35, an anemometer 36, a rain gauge 37 and a barometer 38 or the like in addition to the thermography 31 and the thermometer 32.

The microphone 33 acquires a traveling sound of a vehicle and converts it to speech data. The vibration meter 34 measures vibration of a road surface. The light quantity sensor 35 measures an amount of incident light, mainly sunlight. The anemometer 36 measures a wind direction and a wind speed (wind condition). The rain gauge 37 measures an amount of precipitation. The barometer 38 measures an atmospheric pressure. Measurements using the microphone 33 and the vibration meter 34 may be provided with directivity so as to reduce noise from other vehicles and outside.

Installation and measurement positions of measuring devices for measuring meteorological situations such as the microphone 33, the vibration meter 34, the anemometer 36 and the rain gauge 37 are not limited to the side of a traveling route of a vehicle as in the case of the installation position of the aforementioned thermometer 32. The anemometer 36 may be separated from the traveling route to avoid influences of a wind pressure with the passage of vehicles. The rain gauge 37 may be provided at a distance from the traveling route and at a height to avoid influences of other components of the overload detection system 1a, shade and wind of traveling vehicles. When sunlight, wind and rain are affected by surrounding buildings, structures, forest or topography or the like in the vehicle photographing area of the traveling route (photographing spot), the light quantity sensor 35, the anemometer 36 and the rain gauge 37 may be disposed within a range in which influences similar to these influences can be obtained. That is, the meteorological situations referred to here include local phenomena caused by topography and buildings and structures or the like.

In addition to them, the measurer 30a may also separately include a measurement vehicle or the like that measures road surface conditions (flatness and smoothness conditions or the like). For example, the flatness and smoothness conditions may be measured by radiating laser rays onto the road surface while causing a vehicle to be measured to travel at a constant speed at night and measuring the flatness and smoothness conditions through reflected waves thereof. Furthermore, material data and/or hardness data or the like of the road surface may be measured and stored using samples or the like in advance. When surface physical properties such as hardness of the road surface change due to a temperature condition of the road surface, values related to road surface conditions may be stored as the environment adjustment data 2231 in accordance with the road surface temperature or the like.

Next, an overload determination operation of the present embodiment will be described. In the overload determination operation of the present embodiment, it is determined whether or not a weight corresponding to the value measured by the measurer 30 exceeds the limit loading weight in addition to the calculation of the deformation determination amount in the above-described embodiment.

FIG. 10 is a diagram illustrating a correspondence relationship between measured data and vehicle acceleration.

The magnitude of a traveling sound of the vehicle (sound generated by traveling) and vibration of the road surface corresponding to traveling increase in accordance with the loading weight. These values further change in accordance with the acceleration of the vehicle. That is, the greater the absolute value of acceleration, the greater the traveling sound and vibration become while the loading weight remaining the same. Here, a sound volume and a vibration amount corresponding to the limit loading weight are defined for a plurality of accelerations of the vehicle respectively. Furthermore, the deformation determination amount (deformation determination amount equivalent value) itself also increases as the magnitude of acceleration increases. Therefore, the determination reference value is also changed in accordance with the acceleration. That is, loading weights can be estimated respectively according to the magnitude of the traveling sound and the magnitude of vibration of the road surface. Since the acceleration of the vehicle is not always constant during photographing of the vehicle, vibration and/or sound generated in a plurality of acceleration states may be acquired and it may be estimated that the loading weights are closest to these correspondence relationships.

The speed (traveling speed) and acceleration of the vehicle may be calculated based on a position change amount of the vehicle in image data consecutively photographed of the same vehicle. Therefore, in the overload detection system 1a of the present embodiment, speed and acceleration are calculated from a plurality of pieces of image data photographed at a predetermined time interval for each vehicle and overload is determined after acquiring a sound volume and/or vibration amount for a measurement period of the acceleration. After acquiring a plurality of determinations on the presence or absence of overload including photographed images, if overload is determined among results representing a predetermined proportion or higher (for example, two or more types out of three types), it is determined that it is highly likely that violation of loading weight has occurred.

A traveling vehicle body (cargo bed) can be subject to vibration corresponding to a load thereof. Stress applied to the tire also changes in accordance with the vibration and a deformation value (deformation determination amount) also fluctuates. Since a frequency of vibration of the vehicle body changes depending on the vehicle body weight, frequencies and phases are obtained from a plurality of pieces of image data obtained through consecutive photographing. After these frequencies and phases are confirmed, the controller 21 may select image data at timing close to a phase where there is no influence of vibration on the deformation value (phase 0 or π of a sine wave) and determine overload. Instead of or in addition to a selection of image data, if a frequency is higher than a predetermined reference frequency (according to the type of the vehicle if necessary), the determination reference value may be lowered (reference is made stricter).

Note that the frequency and phase may be calculated by directly measuring vibration (fluctuation) of a deformation value of the tire as vibration of the vehicle body.

Furthermore, an inclination of the vehicle body may be calculated using images of the vehicle photographed by the photographing apparatuses 10 at a plurality of positions. When a load (loading object) is considerably deviated from the center of gravity of the vehicle body (cargo bed), stress applied to a plurality of tires is unevenly distributed and the vehicle body is inclined. Therefore, the controller 21 estimates the deviation of load based on a forward/backward and/or leftward/rightward inclination of the vehicle body obtained from a plurality of photographed images and corrects a deformation value or deformation determination amount of each tire.

The inclination may be identified using a contour which is estimated to be horizontal, for example, a window frame or side tilt. As for correction, for a front-back deviation, a value obtained by averaging deformation determination amounts of front and back tires weighted according to the deviation may be used, and for a left-right deviation, a value obtained by averaging deformation determination amounts of left and right tires weighted according to the deviation may be used.

Under conditions of strong wind, wind stress applied to tires may be uneven in accordance with the stress on the wind. In this case, if the stress appears as an inclination of the vehicle body as described above, the uneven stress on the tires may be solved by a correction based on the inclination. Alternatively, erroneous determination may be suppressed by selectively relaxing determination reference values for tires on the leeward side.

When tires are exposed to direct sunlight, temperatures of the tires rise, and so measured values of the light quantity sensor 35 instead of the thermography 31 may be used as values corresponding to the temperatures of the tires. Alternatively, it is possible to allow the light quantity sensor 35 to detect the irradiation direction of sunlight, determine whether a temperature distribution is toward the shady side or the sunny side using the light quantity sensor 35 together with the thermography 31 and adjust the acquired surface temperature. It is also possible to adjust temperature according to a traveling history of the vehicle (whether there are more sunny spots or shady spots) by comparing temperature on the outside of the tire and temperature on the inside of the tire (without being limited to the tires, can be vehicle body temperatures such as the bottom or side face of the vehicle body). Furthermore, the light quantity to be measured of the light quantity sensor 35 may be associated with the photographing sensitivity or the like. That is, for photographing at night, photographing sensitivity may be increased in exchange of an increase of noise.

Furthermore, the harder the road surface at a photographing spot of an image relating to overload determination, the less compression deformation of the road surface is caused by the load, and so the coefficient of restitution of the tire increases and the deformation amount changes. Therefore, the determination reference value may be increased or decreased depending on the hardness of the road surface. In the case of poor visibility caused by rain or the like, the accuracy of identifying the position of a feature point from a photographed image may deteriorate, and so an error in the calculated deformation determination amount will increase. Therefore, the determination reference value may be increased or decreased in a rainy weather or depending on the amount of rainfall.

Figure 11:
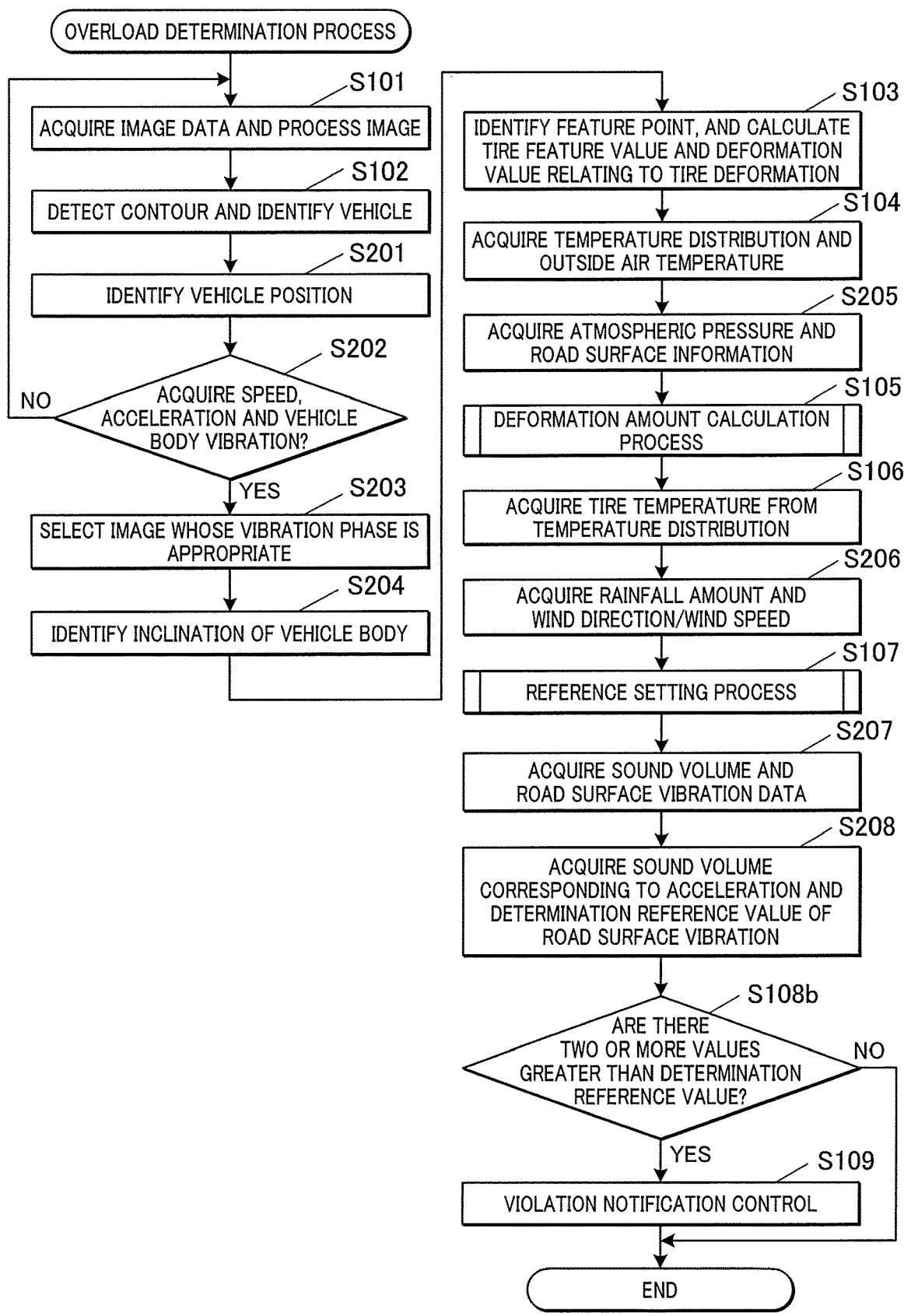
FIG. 11 is a flowchart illustrating a control procedure of an overload determination process according to the third embodiment.

FIG. 11 is a flowchart illustrating a control procedure of an overload determination process by the controller 21 executed in the processing apparatus 20 of the present embodiment.

In this overload determination process, processes in steps S201 to S208 are added to the processes described in the first embodiment or the second embodiment and the process in step S108 is changed to a process in step S108*b*. The same processes are assigned the same reference numerals and detailed description thereof will be omitted.

After the process in step S102, the controller 21 identifies the position of the identified vehicle (step S201). The controller 21 determines whether or not parameters relating to the speed and acceleration of the vehicle and vibration of the vehicle body are acquired based on the identified position of the vehicle so far (step S202). When it is determined that some parameters are not acquired ("NO" in step S202), the process of the controller 21 returns to step S101.

When it is determined that parameters relating to the speed, acceleration and vibration of the vehicle body are acquired ("YES" in step S202), the controller 21 selects image data with an appropriate vibration phase (step S203). The controller 21 identifies an inclination of the vehicle body in the selected image (step S204). The process of the controller 21 then proceeds to step S103.

After the process in step S104, the controller 21 acquires an atmospheric pressure and road surface information (step S205). The road surface information may include a road surface temperature based on a temperature distribution. The process of the controller 21 then proceeds to step S105.

After the process in step S106, the controller 21 acquires data of an amount of rainfall and wind direction/wind speed (step S206). The controller 21 calls a reference setting process and sets a determination reference value (step S107). The controller 21 acquires sound volume data and road surface vibration data relating to traveling of the vehicle (step S207). The controller 21 acquires a determination reference value of a sound volume corresponding to the acceleration acquired in step S202 and a determination reference value of road surface vibration respectively (step S208).

The controller 21 compares a deformation determination amount and a determination reference value relating to deformation, a sound volume and a determination reference value relating to the sound volume, and road surface vibration and a determination reference value relating to the road surface vibration respectively, and determines whether or not there are two or more values greater than the respective determination reference values (step S108*b*). When it is determined that there are no more than one value (less than two values) ("NO" in step S108*b*), the controller 21 ends the overload determination process. When it is determined that there are two or more values ("YES" in step S108*b*), the process of the controller 21 proceeds to step S109.

The processes in steps S207 and S108*b* constitute first estimation means of the present embodiment and the processes in steps S208 and S108*b* constitute second estimation means of the present embodiment.

Figure 12:
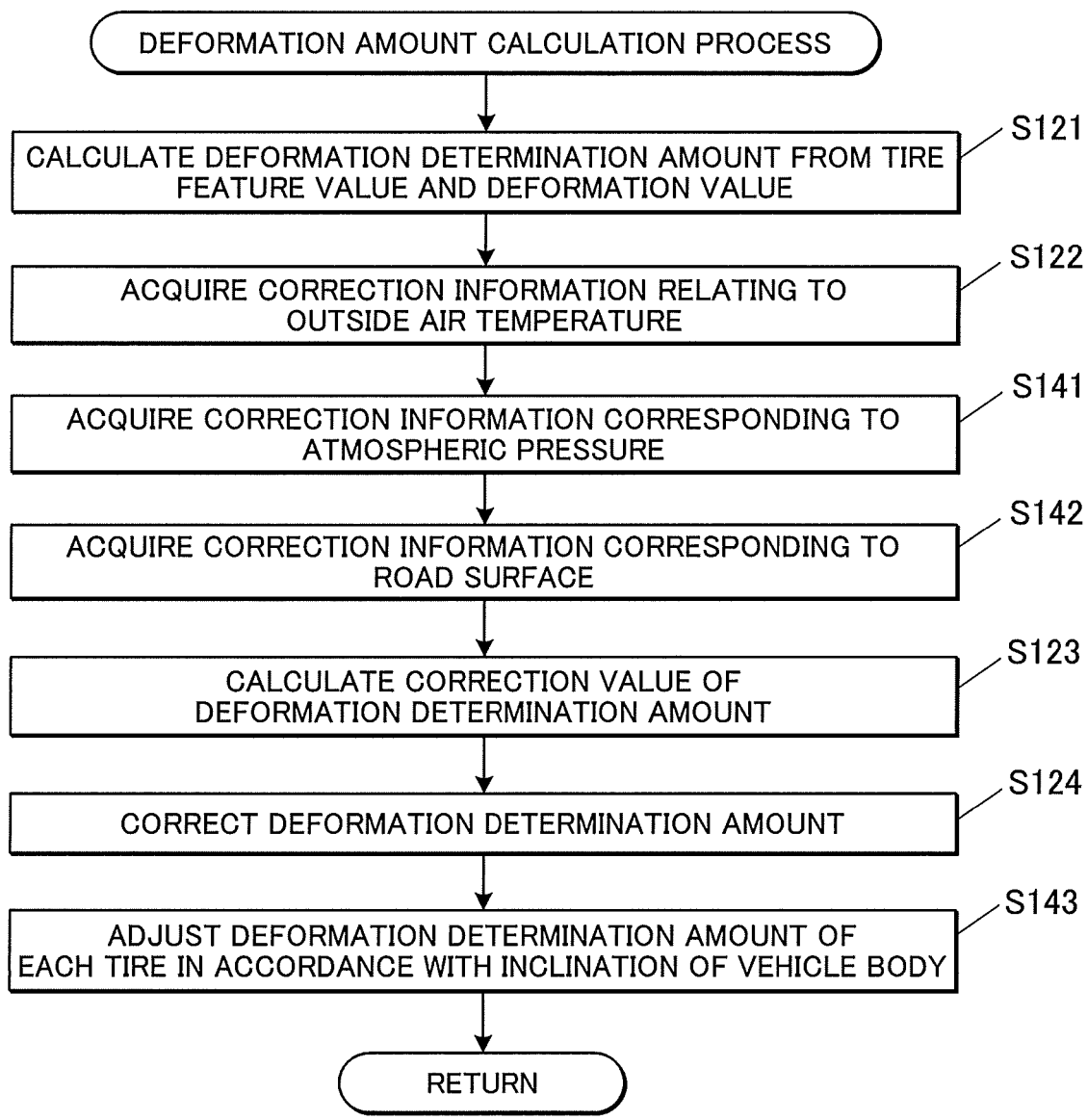
FIG. 12 is a flowchart illustrating a control procedure of a deformation amount calculation process according to the third embodiment.

FIG. 12 is a flowchart illustrating a control procedure of a deformation amount calculation process by the controller 21 called in the overload determination process of the present embodiment. In the deformation amount calculation process, processes in steps S141 to S143 are added to the deformation amount calculation process shown in FIG. 5. The other processing contents are identical and the identical processing contents are assigned identical reference numerals and description thereof is omitted.

After the process in step S122, the controller 21 acquires correction information corresponding to an atmospheric pressure (step S141). The controller 21 acquires correction information corresponding to a road surface condition (step S142). Then, the process of controller 21 proceeds to step S123.

After the process in step S124, the controller 21 makes an adjustment between deformation determination amounts of a plurality of tires in accordance with the inclination of the vehicle body (step S143; adjustment means). The controller 21 then returns the process to the overload determination process.

Figure 13:
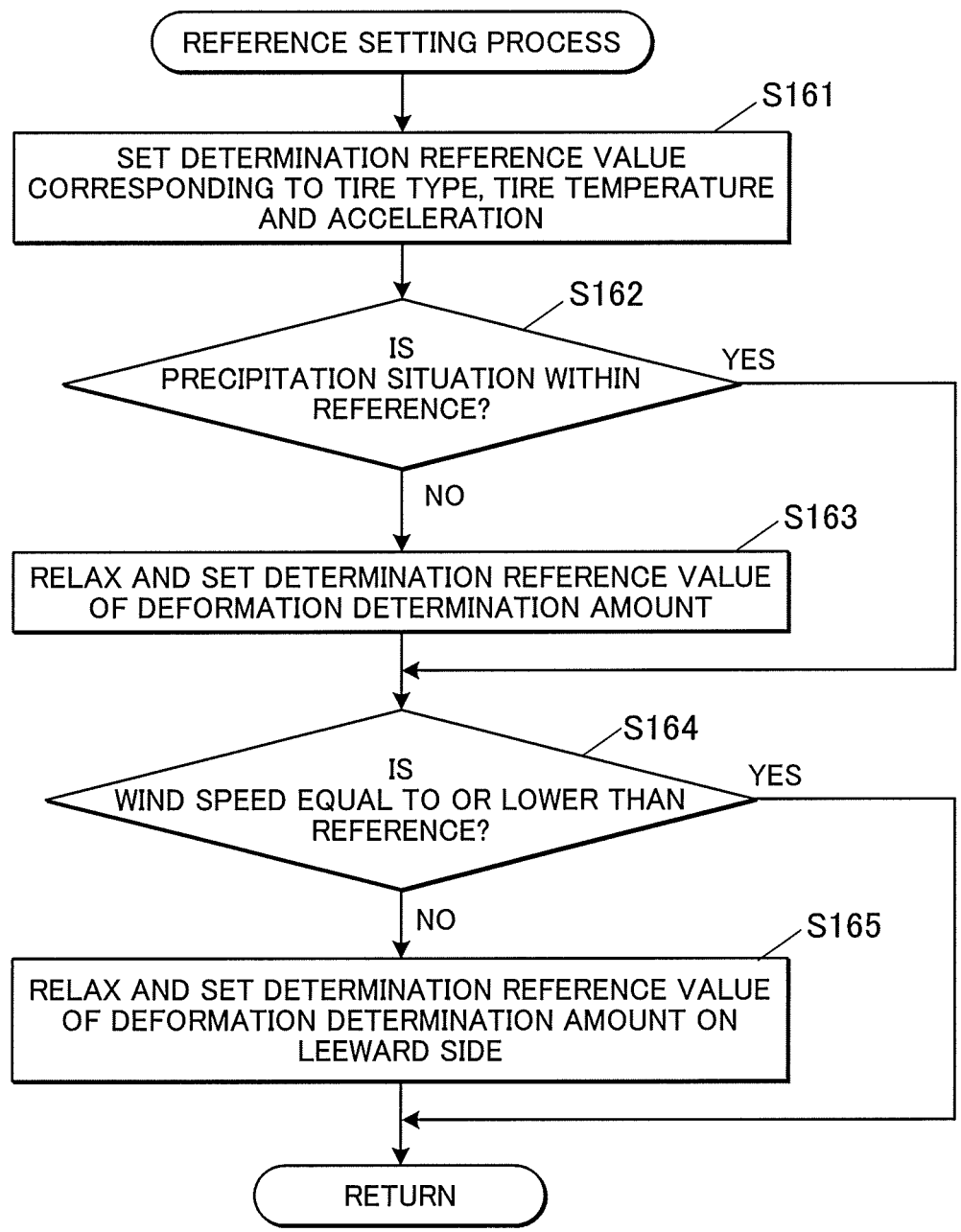
FIG. 13 is a flowchart illustrating a control procedure of a reference setting process according to the third embodiment.

FIG. 13 is a flowchart illustrating a control procedure of a reference setting process by the controller 21 called in the overload determination process of the present embodiment. This reference setting process has contents different from the contents of the reference setting process shown in the second embodiment.

After calling the reference setting process, the controller 21 sets determination reference values in accordance with the tire type, tire temperature and acceleration (step S161). The controller 21 determines whether the precipitation situation falls within a reference (equal to or below the reference) or not (tire photographing condition) (step S162). When it is determined that the precipitation situation does not fall within the reference ("NO" in step S162), the controller 21 changes the determination reference value of the deformation determination amount, that is, the controller 21 performs a setting for relaxing (increasing) the reference value (step S163). The process of the controller 21 proceeds to step S164. When it is determined that the precipitation situation falls within the reference ("YES" in step S162), the process of the controller 21 proceeds to step S164.

When the process proceeds to a process in step S164, the controller 21 determines whether or not the wind speed is equal to or less than a reference value (step S164). When it is determined that the wind speed is equal to or less than the reference value ("YES" in step S164), the controller 21 returns the process to the overload determination process. When it is determined that the wind speed is not equal to or less than the reference value (greater than the reference value) ("NO" in step S164), the controller 21 performs a setting for relaxing (increasing) the determination reference value of the deformation determination amount based on the wind direction and the traveling direction of the vehicle for tires on the leeward side (step S165). The controller 21 then returns the process to the overload determination process.

The processes in steps S162 to S165 constitute reflection means for reflecting data corresponding to a situation related to the tire in a comparison value in the processing apparatus 20 of the present embodiment. The processes in steps S162 and S163 may not be included in the reflection means.

As described above, in the processing apparatus 20 of the present embodiment, the controller 21, as the reflection means, reflects a situation relating to the tires in the determination reference value corresponding to the predetermined reference. The controller 21, as the determination means, compares the determination reference value with the deformation determination amount.

That is, the processing apparatus 20 of the present embodiment changes the determination reference value according to the situation relating to the tires. Thus, it is possible to determine overload more appropriately in accordance with a situation and perform accurate detection by changing the determination reference value instead of the deformation determination amount or together with the deformation determination amount.

The meteorological situations include wind conditions. When there is a strong wind pressure in a gale or the like, the stress may differ for each tire, and it is thereby possible to determine overload more accurately by appropriately reflecting such influences.

Furthermore, the environmental conditions include an atmospheric pressure. When a pneumatic pressure in tires is higher than an outside atmospheric pressure at a place with a high altitude or the like, the tires are less likely to deform correspondingly, and it is thereby possible to determine overload more appropriately and accurately in consideration of such influences.

Furthermore, the environmental conditions include conditions of a road surface. When the roughness of the road surface is large or when the road surface is soft and deformed according to a load, vibration may occur in the tires and the vehicle body or a force may be applied locally, preventing deformation from conforming to a loading weight. In consideration of such influences, the processing apparatus 20 adjusts the deformation determination amount and/or determination reference value in accordance with the road surface conditions, and can thereby determine overload more accurately.

The traveling situations include at least one of a traveling speed and acceleration of the vehicle.

Friction may change depending on the rotation speed of a tire, or friction between the road surface and the tire may change depending on the acceleration, that is, use or no use of the accelerator and the brake. By adjusting the deformation determination amount and/or the determination reference value in accordance with such a variation, it is possible to determine overload more accurately.

The traveling situations include vibration of the vehicle body of the vehicle. Vibration is generated in the vehicle body depending on the aforementioned road surface conditions and situations of changes of acceleration and speed or the like, but a frequency of the vibration may depend on the loading weight. That is, by taking such vibration of the vehicle body into consideration, it is possible to determine overload more reliably.

The traveling situations also include an inclination of the vehicle body of the vehicle. When a cargo load is deviated to the vehicle body (cargo bed), a force may not be applied uniformly to the tires. By appropriately dealing with such unevenness, it is possible to determine overload more accurately.

Particularly, the controller 21 adjusts, as the adjustment means, the values between deformation determination amounts relating to a plurality of tires of the vehicle according to the inclination of the vehicle body as described above. That is, the controller 21 adjusts the values so as to equalize differences in a pressure per tire in consideration of a deviation of load in accordance with the inclination, and can thereby determine overload more accurately.

Furthermore, the controller 21, as the reflection means, reflects photographing conditions of the tire in accordance with the environmental conditions in the determination reference value. That is, when there is an influence (adverse influence in particular) on the acquisition accuracy of photographing and a deformation value of the tire (deformation determination amount) in accordance with a surrounding environment, it is possible to suppress erroneous determinations of overload by appropriately changing the determination reference value according to the influences.

Furthermore, the photographing conditions include a precipitation situation. That is, when it is difficult to accurately identify a deformation determination amount from image data due to precipitation, it is possible to suppress the occurrence of erroneous determinations by increasing (relaxing) the determination reference value as the identification accuracy is degraded.

The controller 21, as the first estimation means, designates vibration of the road surface relating to traveling of the vehicle as an estimate value corresponding to the above-described deformation determination amount and, as the determination means, makes a determination relating to whether or not there is an excess of the loading weight based on the acquired deformation determination amount and the magnitude (estimate value) of vibration of the road surface.

That is, since overload is determined not only from image data but also according to vibration of the road surface, it is possible to reduce the possibility of erroneous determination and more reliably and accurately determine overload.

The controller 21, as the second estimation means, designates sound generated by traveling of the vehicle as an estimate value corresponding to the above-described deformation determination amount, and as the determination means, makes a determination relating to whether or not there is an excess of the loading weight based on the acquired deformation determination amount and the magnitude (estimate value) of the sound generated.

That is, since overload is determined not only from image data but also in accordance with the traveling sound, it is possible to reduce a possibility of erroneous determination and more reliably and accurately determine overload.

Note that the present invention is not limited to the above-described embodiments but can be changed in various ways. For example, measurements of only some of temperature, sound volume, vibration, light quantity, wind direction/wind speed, amount of rainfall, atmospheric pressure, road surface condition or the like in the measurer 30 or 30a that measures environmental conditions may be provided. Furthermore, overload determination may be adjusted based on only vehicle body vibration or the like based on image information acquired by the photographing apparatus 10.

In the above-described embodiments, environmental conditions and traveling situations are taken into consideration, but only one of them may be taken into consideration.

Some of measurements by the measurer 30 or 30a may not be performed but may be set through user operation or the like. For example, by entering altitude data of photographing spots, a corresponding average atmospheric pressure may be set. Furthermore, when there are meteorological situation observation spots in the neighborhood, data at the observation spots may be acquired and used.

In the above-described embodiments, when the vehicle body is inclined due to a deviation of load or the like, deformation determination amounts of a plurality of tires are averaged and adjusted, but maximum determination reference values may be provided not only for deformation as a whole but also for individual tires, and a limit of deviation in the case where there is a deviation may also be detected together.

In the above-described third embodiment, overload is estimated together based on vibration of the road surface and sound generated, but any one of them may be performed. Furthermore, loading weight may be estimated based on not only the magnitude of vibration and sound volume, but also frequency or the like. In the above-described embodiments, reference values of vibration and sound generated are defined in accordance with acceleration, but speed setting may be used instead of/in addition to the acceleration.

Even when sufficient photographing accuracy cannot be obtained due to fog, snow or a cloud of dust or the like in addition to precipitation, it is possible to change determination reference values as appropriate and thereby suppress erroneous determination of overload.

A tire deformation amount depends on a pneumatic pressure of a tire as well. An insufficient pneumatic pressure of the tire poses a danger even when a loading weight thereof falls within an appropriate range, and so it may be possible to detect tire deformation relating to a deformation determination amount equal to or greater than a deformation reference value irrespective of whether or not there is an excess of the loading weight in the strict sense. In this case, it is possible to determine whether or not the deformation amount exceeds the reference not only in the case where the type of the vehicle is identified but also based on the deformation determination amount of the tire and the tire situation without identifying the vehicle type and/or tire type. Similarly, even when the vehicle type and/or tire type cannot be identified, the presence or absence of overload may be estimated based on the deformation determination amount of the tire and the tire situation.

The configurations, processing contents and procedures or the like separately described in the first to third embodiments may be arbitrarily separated or combined.

In the above-described embodiments, the ratio between the deformation value and the tire reference value is used as the deformation determination amount, but to be simpler, the deformation value itself may be used.

The above embodiments have been described assuming that a vehicle is traveling, but this does not exclude use of images taken while the vehicle is temporarily stopped due to congestion or the like. That is, the situation in which the vehicle is stopped is also included in the traveling situation of the vehicle.

In the above-described embodiments, the controller 21 performs, through the CPU 211, all analyses and overload determination processes by software. However, for example, there may also be a configuration in which some processes are executed by a dedicated hardware circuit or the like.

In the above description, although the storage 22 constructed of a non-volatile memory has been described as an example of a computer-readable recording medium of the program 221 relating to a processing operation of the controller 21 according to the present invention, the present invention is not limited to this. It is possible to apply a portable recording medium such as an HDD (Hard Disk Drive), CD-ROM or DVD disk as other computer-readable recording media. A carrier wave (carrier) is also applicable to the present invention as a medium that provides data of a program according to the present invention via a communication channel.

In addition, the specific configurations, operation contents and procedures or the like shown in the above-described embodiments can be changed as appropriate without departing from the spirit and scope of the present invention.

The disclosure of Japanese Patent Application No. 2018-088590, which is the Japanese application submitted on May 2, 2018 is incorporated in the present application by reference in its entirety.

Although embodiments of the present invention have been described and illustrated in detail, the disclosed embodiments are made for purposes of illustration and example only and not limitation. The scope of the present invention should be interpreted by terms of the appended claims.

What is claimed is:

1. An overload detection processing apparatus for determining a vehicle whose loading weight exceeds a predetermined reference, the apparatus comprising a processor, wherein the processor acquires a determination value relating to magnitude of deformation of a tire from image data obtained by photographing the tire of the vehicle and determines whether or not the loading weight of the vehicle exceeds the predetermined reference based on the determination value and data corresponding to a situation relating to the tire.

2. The overload detection processing apparatus according to claim 1, wherein the processor corrects the determination value based on data corresponding to the situation relating to the tire.

3. The overload detection processing apparatus according to claim 1, wherein the processor reflects the data corresponding to the situation relating to the tire in a comparison value corresponding to the predetermined reference and compares the comparison value and the determination value.

4. The overload detection processing apparatus according to claim 1, wherein the processor selects any one predetermined reference from among a plurality of the predetermined references in accordance with the situation relating to the tire.

5. The overload detection processing apparatus according to claim 1, wherein the situation relating to the tire includes environmental conditions surrounding the tire.

6. The overload detection processing apparatus according to claim 1, wherein the situation relating to the tire includes a traveling situation of the vehicle.

7. The overload detection processing apparatus according to claim 5, wherein the environmental conditions include a meteorological situation at a photographing spot.

8. The overload detection processing apparatus according to claim 7, wherein the meteorological situation includes an outside air temperature.

9. The overload detection processing apparatus according to claim 7, wherein the meteorological situation includes a wind condition.

10. The overload detection processing apparatus according to claim 5, wherein the environmental conditions include an atmospheric pressure.

11. The overload detection processing apparatus according to claim 5, wherein the environmental conditions include a road surface condition.

12. The overload detection processing apparatus according to claim 6, wherein the traveling situation includes a surface temperature at a predetermined location of the tire.

13. The overload detection processing apparatus according to claim 6, wherein the traveling situation includes at least one of a traveling speed and acceleration of the vehicle.

14. The overload detection processing apparatus according to claim 6, wherein the traveling situation includes vibration of a vehicle body of the vehicle.

15. The overload detection processing apparatus according to claim 6, wherein the traveling situation includes an inclination of a vehicle body of the vehicle.

16. The overload detection processing apparatus according to claim 15, wherein the processor makes an adjustment between the determination values relating to a plurality of the tires of the vehicle in accordance with the inclination.

17. The overload detection processing apparatus according to claim 3, wherein the situation relating to the tire includes environmental conditions surrounding the tire, and
the processor reflects photographing conditions of the tire corresponding to the environmental conditions in the comparison value.

18. The overload detection processing apparatus according to claim 17, wherein the photographing conditions include a precipitation situation.

19. The overload detection processing apparatus according to claim 1, wherein the processor estimates the determination value based on vibration of a road surface relating to traveling of the vehicle, and determines the presence or absence of an excess in the loading weight based on the acquired determination value and magnitude of the vibration of the road surface.

20. The overload detection processing apparatus according to claim 1, wherein the processor estimates the determination value based on sound generated by traveling of the vehicle, and
determines the presence or absence of an excess in the loading weight based on the acquired determination value and magnitude of the sound generated.

21. The overload detection processing apparatus according to claim 1, further comprising a storage which stores a determination list which defines the predetermined reference in accordance with data of the vehicle, wherein
the processor identifies the type of the vehicle from the image data, and
performs the determination by selecting the predetermined reference corresponding to the type of the vehicle from the determination list.

22. The overload detection processing apparatus according to claim 21, wherein
the determination list is stored for each of a plurality of the situations relating to the tires, and
the processor performs the determination using the predetermined reference in the determination list selected in accordance with the situations relating to the tires.

23. The overload detection processing apparatus according to claim 1, wherein the determination value is a relative value between a value indicating the amount of deformation of the tire and a value based on the data before deformation of the tire.

24. An overload detection system comprising:
the overload detection processing apparatus according to claim 1;
a photographing device that photographs a tire of the vehicle; and
a situation acquirer that acquires the situation relating to the tire.

25. A non-transitory computer-readable recording medium storing a program causing a computer to perform:
acquiring a determination value relating to magnitude of deformation of a tire of a vehicle from image data obtained by photographing the tire of the vehicle; and
determining whether or not a loading weight of the vehicle exceeds the predetermined reference based on the determination value and data corresponding to a situation relating to the tire.

* * * * *